(12) United States Patent
Allehaux et al.

(10) Patent No.: US 8,393,519 B2
(45) Date of Patent: Mar. 12, 2013

(54) METHOD OF ASSEMBLING METAL PARTS BY FRICTION WELDING, WITH THE WELDING TEMPERATURE BEING CONTROLLED USING THERMALLY CONDUCTIVE ELEMENTS

(75) Inventors: Delphine Allehaux, Velaux (FR); Jean-Loup Gatti, Marseilles (FR)

(73) Assignee: Eurocopter, Marignane Cedex (FR)

( * ) Notice: Subject to any disclaimer, the term of this patent is extended or adjusted under 35 U.S.C. 154(b) by 14 days.

(21) Appl. No.: 12/724,516

(22) Filed: Mar. 16, 2010

(65) Prior Publication Data
US 2010/0243714 A1    Sep. 30, 2010

(30) Foreign Application Priority Data
Mar. 26, 2009 (FR) .................................. 09 01427

(51) Int. Cl.
*B23K 20/12* (2006.01)
(52) U.S. Cl. ..................................... 228/112.1; 228/2.1
(58) Field of Classification Search ............... 228/2.1, 228/112.1
See application file for complete search history.

(56) References Cited

U.S. PATENT DOCUMENTS

| | | | |
|---|---|---|---|
| 5,493,097 A | | 2/1996 | Gustafsson et al. |
| 6,153,848 A | * | 11/2000 | Nagae et al. .................. 219/110 |
| 6,360,937 B1 | * | 3/2002 | De Koning .................. 228/112.1 |
| 6,518,536 B2 | * | 2/2003 | Fujii et al. ..................... 219/110 |
| 7,121,448 B2 | * | 10/2006 | Subramanian et al. ........ 228/2.1 |
| 2005/0045694 A1 | | 3/2005 | Subramanian et al. |
| 2007/0064403 A1 | | 3/2007 | Badarinarayan et al. |
| 2008/0099533 A1 | * | 5/2008 | Hanlon et al. ............. 228/112.1 |
| 2009/0200359 A1 | * | 8/2009 | Chen et al. ................. 228/112.1 |

FOREIGN PATENT DOCUMENTS

| | | |
|---|---|---|
| EP | 1 048 390 A2 | 11/2000 |
| EP | 1 920 868 A1 | 5/2008 |
| JP | 2001-001059 A | 1/2001 |

OTHER PUBLICATIONS

French Search Report, dated Nov. 4, 2009, from corresponding French application.

* cited by examiner

*Primary Examiner* — Devang R Patel
(74) *Attorney, Agent, or Firm* — Brooks Kushman P.C.

(57) ABSTRACT

The invention provides a method of assembling together two thin plane parts (1, 2) by friction welding. A main sheet (19) made of a material having high thermal conductivity is held against the parts (1, 2) for assembly. The main sheet (19) picks up the heat induced by the friction of a welding pin (5) against the parts (1, 2) for the purpose of forming the weld bead (17), and it dissipates this heat by radiation. Temperature regulation of the welding operation is obtained by the main sheet (19), ensuring that no localized excess heating occurs in the welding zone. The main sheet (19) is based on copper and presents a thickness that is less than the thickness of the parts (1, 2).

16 Claims, 2 Drawing Sheets

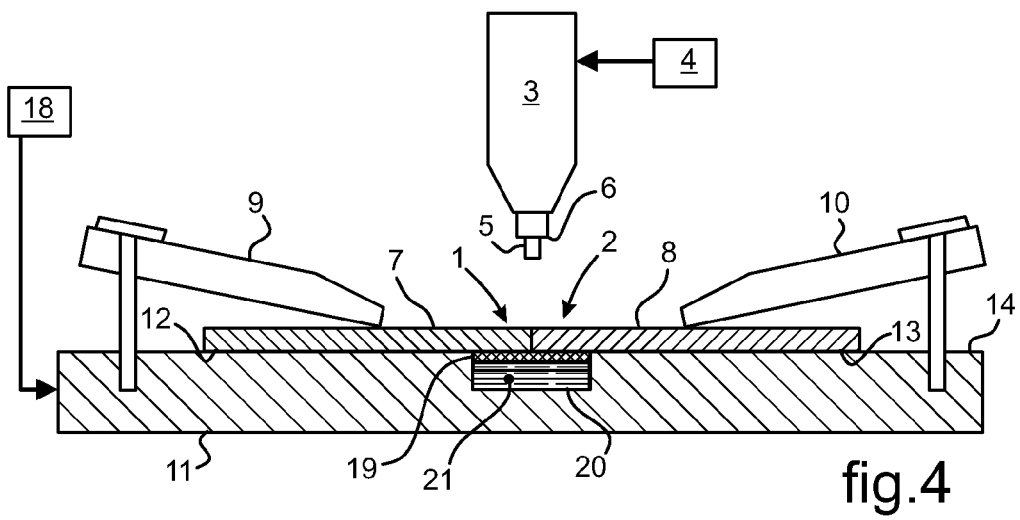
fig.4
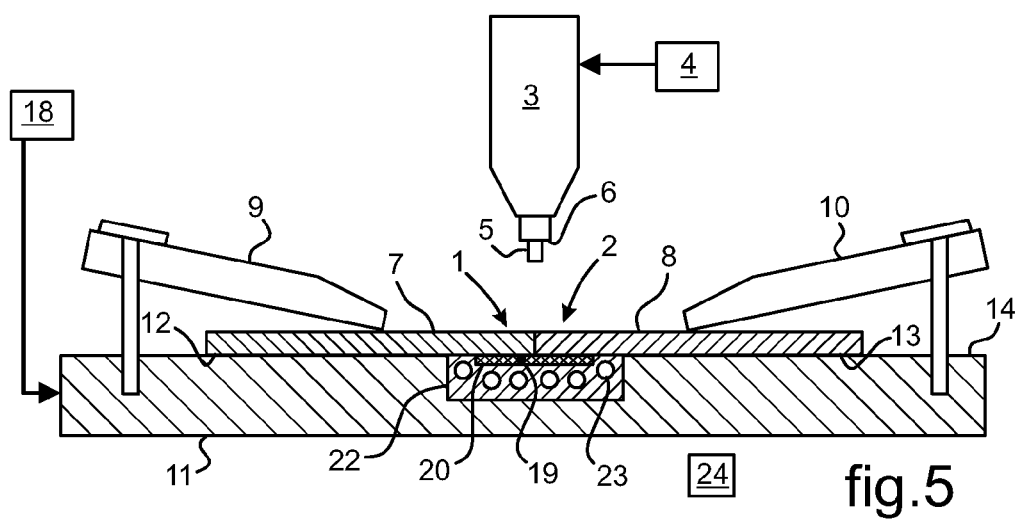
fig.5
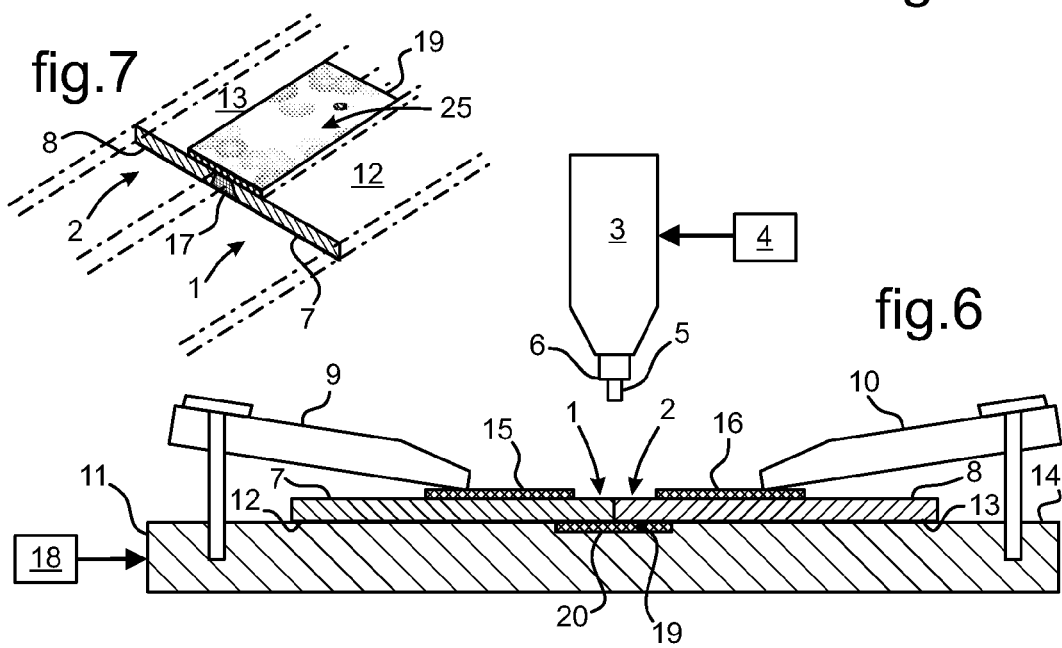
fig.7
fig.6

METHOD OF ASSEMBLING METAL PARTS BY FRICTION WELDING, WITH THE WELDING TEMPERATURE BEING CONTROLLED USING THERMALLY CONDUCTIVE ELEMENTS

FIELD OF THE INVENTION

The invention relates to the technical field of friction welding for connecting together two plane or shaped metal parts, the method including an operation of controlling temperature during the welding operation. The method provides such a friction-welding method, and more particularly a technique of controlling temperature during the welding operation.

BACKGROUND OF THE INVENTION

Welding techniques include techniques performed by friction, such as friction stir welding (FSW). Such a technique is advantageous for assembling together metal parts for assembly that are plane or shaped, such as plates, sheets, or other analogous parts. The parts for assembly are held adjacent to each other and pressed against an anvil, by clamping or by some other analogous technique. The term "anvil" is used to designate any member suitable for forming a working surface or analogous member, with the parts being clamped thereto so that they are pressed against the anvil either directly or indirectly. By analogy, when welding parts that are shaped, the anvil may be itself be shaped to be complementary to the profile of the parts for assembly, so as to allow them to be pressed thereagainst. The parts are held pressed against the anvil by means of clamps, being located edge to edge in order to form the weld bead in the zone where the edges are adjacent to each other, corresponding to a weld zone. The parts may be put into abutment as a result of putting corresponding edge faces of the parts into contact with each other, or they may overlap, with a margin of one part lapped on a margin of the other part, in particular a part that includes a rabbet or the like for this purpose. A chuck has a shoulder and a welding pin provided with roughness in relief, which roughness is formed at its free end opposite from its end held by the chuck. The roughness in relief may be arranged as a thread, or as a section of polygonal shape for the free end of the welding pin. Placing the welding pin into contact with the adjacent edges of the parts and then organizing relative movement therebetween serves to form a weld bead and consequently to assemble the parts together. The weld bead is obtained by heating the parts under the effect of rubbing applied locally thereto by the welding pin in the weld zone. In addition, the shoulder presents a surface state that contributes to heating the parts for welding by friction. More particularly, friction with the welding pin and the shoulder leads to the material from which the parts are made heating up so as to obtain a desired pasty state for said material, with the materials of the two parts then mixing together. The two parts are then joined together by the continuous dynamic recrystallization of the material in the weld zone.

A problem arises in achieving accurate control over the temperature to which the parts are subjected during the welding operation. It is necessary to reach a determined welding temperature threshold in order to obtain a weld bead, but without that deforming the parts that are being assembled together. This problem becomes particularly difficult to solve when the parts for welding together are thin, and by way of indication they may present a thickness of the order of one millimeter or one-and-a-half millimeters, and/or for metal parts made of a material that presents poor thermal conductivity. Under such circumstances, friction welding induces localized heat generation very quickly because of the welding pin rubbing against the parts. This heat generation is particularly significant when the chuck is controlled in force, with the shoulder constituting a depth gauge by being pressed into contact with the parts. This localized and rapid temperature rise is likely to reach the melting temperature of the material from which the parts are made, and as a result, failing to obtain the desired pasty state, and more particularly not obtaining stable viscous spreading of the material constituting the parts as is required for the recrystallization step. It can thus be seen that a difficulty to overcome lies in obtaining temperature regulation in the weld zone of the material from which the parts are made, in particular when the metal parts are thin and even more so when they are made of a material presenting low thermal conductivity, or of respective materials that are different. Such temperature regulation is made more difficult to obtain when the welding pin is controlled in force with the shoulder that is associated therewith being pressed against the parts for welding.

In this field, it is conventional to implement a transient step for evaluating the dynamic characteristics specific to the welding pin prior to performing the welding operation. These characteristics relate in particular to the speed of rotation of the chuck and the speed of relative movement in translation between the welding pin and the parts along the weld zone. This transient step consists in placing the parts for welding together on the anvil and then in starting the weld bead over a required distance of the order of up to thirty centimeters in order to define as well as possible the ranges for the speeds of rotation of the chuck and for the speeds of relative movement in translation. Once the resulting welding conditions are satisfactory, the modeling of these dynamic characteristics is defined so as to obtain determined welding conditions, e.g. given the thickness of the parts for assembly, and the material from which they are made, the characteristics specific to the welding pin, and/or the environment of the welding zone. Nevertheless, when the parts are thin and/or of low thermal conductivity, or indeed of different thermal conductivities, the transient step is not sufficient to define in reliable and satisfactory manner the operations that are necessary for obtaining stable viscous spreading of the material in the weld zone. In addition, this transient step may be ineffective in the event of the parts for assembly being of respective thicknesses that vary along the weld bead that is to be formed. It is then necessary to reduce the speed of rotation and the speed of said relative movement in translation, thereby degrading the productivity of the welding operation.

Friction-welding techniques performed on parts of small thickness and/or low thermal conductivity require the welding pin to be controlled very precisely. When assembling together plane metal parts it is commonly preferred for the welding pin to work in an optimized force situation in order to increase the heating of the parts for assembly. Nevertheless, such working conditions are not suitable for parts of small thickness and/or low thermal conductivity because of the risk of the weld bead collapsing during welding. In addition, although controlling the welding pin in force can be satisfactory in terms of productivity and/or the advantage obtained by the shoulder acting as a depth gauge, it can also lead to increasing the risks of the welding pin breaking and of tending to cause the parts to stick to the anvil, which is to be avoided. As a result, for parts that are of small thickness and/or of low thermal conductivity, it is preferable in the end to perform the welding operation with the welding pin being controlled in position, i.e. using a chuck that does not have a shoulder since that tends to give rise to too great a temperature rise while forming the weld bead.

It can thus be seen that in this field there is a need to reconcile high rates of production throughput with rigorous control over the heating of the parts in order to obtain a weld bead that presents recrystallization characteristics, and thus mechanical qualities, that are satisfactory.

For example, document EP 1 048 390 (Fokker Aerostructures) proposes a friction-welding method that consists in optimizing the concentration of heat in the weld zone. In order to influence the distribution of heat produced by friction and to obtain such a concentration of heat in the weld zone, it is proposed to interpose massive cross-members between the clamps and the parts for assembly, said cross-members having a thermal conductivity coefficient that is analogous to that of the parts for assembly. An element of thermally insulating material is interposed between the parts for assembly and the anvil, and the welding pin is controlled in force to optimize the production of heat. The heat produced is typically concentrated in the immediate contact zone between the welding pin and the parts for assembly, by avoiding heat dispersion. The heat concentration capacity obtained in the welding zone enables production speeds to be considerably increased with minimum energy consumption. Such a solution for improving productivity is nevertheless not suitable for use with parts of small thickness because of the above-mentioned risks associated with the localized and rapid heat generation that is induced.

Proposals have also been made in U.S. Pat. No. 7,121,448 (Pazhayannur Ramanathan Subramanian et al.) to interpose a heater element between the parts and the anvil, in the welding zone and overlapping both parts, which heater element is formed by a plate extending along the weld bead that is to be formed. The heater element is incorporated in a frame, with the frame and the face of the anvil that supports the parts being flush. The frame also has cooling means, in particular ducts that convey a cooling liquid. The cooling means serve to control the temperature to which the heater element heats, and thus enables temperature to be raised in controlled manner, thereby avoiding localized zones of heat generation around the weld zone, and thus preserving the parts from deformation.

It should be observed that document U.S. Pat. No. 5,493,097 provides a welding method that does not make use of friction welding, and that does make use of an orifice facing the bottom faces of the parts for welding, the orifice being filled with a powder that encourages welding.

OBJECTS AND SUMMARY OF THE INVENTION

The object of the present invention is to propose a friction-welding method for use between two plane metal parts placed adjacent to each other, and more particularly a technique of controlling temperature during the welding operation. Another object of the present invention is to propose tooling for implementing such a method, the tooling being for fitting to a friction-welding machine.

More particularly, an object of the present invention is to propose such a method that is adapted to welding metal parts that are thin, with thickness of about 1.5 millimeters (mm) or less, which parts may be of the same thickness or may have respective different thicknesses, or may have thickness that varies along the weld bead that is to be made, and/or may be made of the same material or of respective different materials, or indeed may be made of materials that present low thermal conductivity.

Another particular object of the present invention is to propose such a method that makes it possible to optimize rates of production throughput while obtaining satisfactory recrystallization of the resulting weld bead, and thus obtaining high performance mechanical characteristics for the assembled-together parts, in particular in terms of reliability, strength, and surface state. It is specifically also an object to obtain temperature regulation of the welding operation over long lengths, in particular by controlling any localized zones of heating, while avoiding localized deformation of the resulting weld bead and/or of the parts, as might occur as a result of thermal stresses induced by the welding operation.

Another particular object of the present invention is to propose such a method that makes it possible to obtain the desired weld bead while using a production machine that is structurally simple, in particular that does not require the use of complex and expensive tooling, that does not need to be implemented in a manner that is restrictive in terms of the types of thin metal parts it can assemble, and that does need a quality control procedure for the resulting assembly between the parts that is complex, unreliable, and/or invasive.

A further object of the present invention is to propose such a method that avoids or even prevents the parts for assembly sticking to the anvil, or any other member suitable for acting as a work bench.

The present invention seeks more particularly to propose such a method that makes it simple optionally to provide protection for the resulting weld bead, in particular during periods of storage and/or transport of parts waiting to be used.

The present invention relates to a method of using friction welding to assemble together two parts for assembly that are plane or shaped. The method proposed by the present invention is particularly suitable for assembling together such parts that are of small thickness, thickness of less than about 1.5 mm. The method proposed by the present invention is also more particularly adapted to assembling together such thin parts even when made of respective materials that are different and of low thermal conductivity, and/or of different thermal conductivities. The method proposed by the present invention is also particularly adapted to such parts that present thickness that nevertheless varies along the weld bead to be formed. Such applications, taken in isolation or in combination, require a procedure and means for controlling and regulating temperature during the welding operation that are particular and specific. The method of the present invention proposes amongst other things, solutions and/or compromises that enable such temperature control and/or regulation procedures to be obtained.

The method of the present invention comprises the operations consisting in:

pressing the parts for assembly individually against an anvil and adjacent to each other. This is achieved in particular by means of at least one set of clamps that press individually against one or the other of the large faces named "top faces" of the parts such that the parts present opposing thrust against a support face of the anvil via their opposite large faces named "bottom faces". The parts being placed "adjacent to each other" corresponds for example to their corresponding edge faces being in abutment one against the other, or indeed to margins of the parts overlapping one on the other, one of the parts being thicker than the other and including a rabbet for receiving the corresponding margin of the other part;

setting into rotation a chuck carrying a welding pin and a shoulder. The shoulder presents the advantageous functions of improving the surface state of the resulting weld bead and of acting as a depth gauge. Such a shoulder gives rise to increased friction between the parts and the tooling associating the welding pin and the chuck, thereby making it necessary to control and regulate a risk of fast and major localized heat generation in the weld zone during the welding operation. The shape of the free end of the welding pin may be arbitrary, since it provides the desired friction effect against the parts;

causing the chuck and the anvil to move relative to each other so as to bring the welding pin towards the top large faces of the parts for assembly. This relative movement may be obtained equally well by moving the chuck and/or the anvil in translation. This movement is performed in particular along a vertical direction that is orthogonal to the plane formed by the support face of the anvil, said plane being oriented in particular horizontally relative to the vertical axis defined by gravity;

pressing the welding pin through both of said adjacent edges of the parts so as to heat the material of the parts by friction in the weld zone. This pressure is applied until the material of each part spreads and mixes with that of the other in order to form a localized weld zone. Starting the weld bead may then be followed by a transient step of forming a transient weld bead;

causing the chuck and the anvil to move relative to each other in translation in at least one direction corresponding to the direction in which the adjacent edges of the parts for assembly extend, thereby obtaining the weld bead. The direction in which the adjacent edges of the parts extend, and consequently the direction in which the weld bead extends, may equally well be rectilinear or include changes of direction, in particular in the plane formed by the support face of the anvil;

inducing recrystallization of the material forming the weld bead by cooling the parts, where cooling may equally well be in ambient air or by using an assisted cooling technique. The weld bead is formed in particular by a mixture of the material coming from each of the parts, as a consequence of said material spreading in the pasty state during the welding operation. More particularly, the cooling of the parts, and more particularly the cooling of the resulting weld bead, is preferably performed in ambient air. Nevertheless, it is possible to envisage controlling recrystallization of the weld bead by using techniques for assisting said recrystallization, such as temperature regulation means, e.g. implementing a cooling fluid, a stream of air, or some other analogous technique.

The method of the present invention is mainly recognizable in that it includes the operation consisting in keeping a sacrificial single main sheet pressed against the weld bead and overlapping against the inside faces of both of the parts, said main sheet being made of a material presenting high thermal conductivity. The main sheet is suitable for conducting away the heat that is induced by the friction of the chuck against the parts, and for dissipating said heat by conduction and by radiation. The friction of the chuck against the parts is caused in particular by pressing the welding pin and the shoulder forcibly against the parts.

Contrary to the usual practice in this field, the method of the present invention seeks to pick up the heat induced by friction between the welding pin and the parts, and to remove this picked-up heat as well as possible in order to mitigate any excess temperature and/or temporary overheating, and thus to avoid major and fast localized heat generation in the weld zone. The use of a main sheet made of a material having high conductivity and that is pressed directly against the parts, at least in the vicinity of the weld zone and overlapping both of the parts to be assembled, provides such evacuation of heat in satisfactory manner without thereby making it more complex to implement the method of assembling the parts together. The use of such a main sheet is particularly well adapted in the context of given applications of the method proposed by the present invention, whether taken in isolation or in combination.

The heat evacuation obtained by the main sheet enables localized fast and excessive heat generation to be avoided in the weld zone during relative movement in translation between the welding pin and the anvil. The resulting control and regulation over the temperature that is induced by the welding operation enables production speeds to be increased while limiting such heat generation so as to avoid the above-mentioned consequences that might otherwise arise. Significant variation in temperature during the welding operation, as might be induced by possible variation in the thicknesses of the parts, is thereby avoided. When the parts are made of respective materials that are different and/or that present low thermal conductivity, the main sheet nevertheless enables the temperature induced during the welding operation to be evacuated in constant and satisfactory manner. The high conductivity qualities of the main sheet give rise to natural dissipation in ambient air of the heat that is induced during the welding operation.

Nevertheless, it is possible to envisage associating the high conductivity of the main sheet with additional cooling means, which means are implemented during the welding operation either continuously, or discontinuously on the basis of information delivered by temperature sensors or the like associated with the main sheet and/or with the localized welding zone. Such cooling means may be the result merely of a stream of air flowing over the main sheet, or may be the result of heat exchange with a heat-conveying cooling fluid that may flow within the anvil.

In a variant implementation, it is proposed to associate each of the parts with at least one secondary sheet made of a material presenting high thermal conductivity, such as copper, for example, and to maintain each secondary sheet pressed against the top face of the parts with which it is associated. The secondary sheet is placed as close as possible to the welding zone so as to optimize its ability to pick up the heat induced by the friction of the welding pin against the parts. The secondary sheets are interposed in particular between at least one clamp and the corresponding part. The clamp may be a specific clamp that is dedicated to the sheet and/or it may be a clamp that is initially dedicated to holding the corresponding parts against the anvil.

Independently of the variant, it is proposed to maintain a sacrificial single main sheet pressed astride against the bottom faces of both of the parts for assembly.

In an implementation, the main sheet is placed against the bottom faces of the parts for assembly, e.g. between an anvil and said bottom faces. Advantageously, the main sheet is a foil having a thickness of the order of one-tenth the thickness of the parts for assembly. In addition, the main sheet may optionally be about 20 mm wide so as to cover the weld bead, and it may present a length that is not less than the length of the parts for assembly.

In another implementation, it is also proposed to place said main sheet in position in a housing included in the anvil and opening out into its support face. The housing is of a depth that is matched to the thickness of the main sheet, e.g. being formed in an interchangeable frame that is received by the anvil, or it may be of a single depth with use being made of a set of spacers for positioning the main sheet relative to the support face of the anvil. The main sheet is positioned inside the housing so that the main sheet is substantially flush with the support face of the anvil. It may be exactly flush therewith or it may be raised a little so as to guarantee that it is pressed against the parts by being flattened without harming the pressing of the parts against the anvil.

Using this single main sheet presents several advantages.

A first advantage lies in the fact that putting it into place in the housing is simple and easy to perform, concerning its positioning relative to the weld bead that is to be made.

In addition, however it is embodied, the main sheet serves to preserve the anvil during the welding operation without harming the desired temperature regulation. The single main sheet constitutes a sacrificial part that is lost and consumable. The drawbacks induced by this sacrificial nature are negligible, particularly in terms of the extra costs involved, since the main sheet constitutes an element that it is negligible to lose. Furthermore, the parts are likely to stick the single main sheet, and since it is a consumable it may be left in place on the parts in order to protect the weld bead during periods of storage and/or transport prior to the parts being used. Furthermore, the presence of the single main sheet gives the resulting weld bead a surface state that is satisfactory on the inside faces of the parts. When said spacers are used, advantage may be taken of them to pick up and dissipate the heat coming from the single main sheet with which they are in contact, thereby increasing the ease with which the looked-for temperature regulation can be obtained in the weld zone.

In the implementation that provides a housing, the housing may advantageously be arranged within a frame that is fitted with cooling means. Such cooling means may be constituted, for example, by ducts located in the frame and conveying a flow of cooling fluid. The cooling means are suitable in particular for inducing heat exchange between the single main sheet and the cooling means.

It should be understood that the two above-mentioned variants may be implemented in isolation or in combination, depending on needs and circumstances. Using these two variants together makes it possible to optimize the picking up of heat induced by the welding operation and to optimize the dissipation of said heat by the secondary and main sheets pressed respectively against the top faces and the bottom faces of the parts.

Proposals are also advantageously made to form the main sheet out of at least one material of external appearance that is modified depending on the temperature to which it has been raised. It should be understood that this modification in external appearance varies depending on the temperature threshold reached and it remains after the main sheet has cooled. This variation may for example be variation in the color of the material, advantageously obtained by making the main sheet out of a material that is based on copper or some other analogous metallic material capable of providing the looked-for modification of appearance. These advantageous examples are given by way of preferred indication, and any other material presenting in combination the looked-for high thermal conductivity and modification of appearance could be used.

On the basis of the modification to the appearance of the main sheet, it is easy to verify with the naked eye that the looked-for temperature did, in fact, remain stable all along the weld bead. This verification is advantageously performed without making use of techniques that are complex and/or invasive, or even unreliable, as are commonly used in this field.

More particularly, it is proposed to inspect the color of said single main sheet at the end of the welding operation in order to inspect the quality of the resulting weld. The same operation may be performed on the secondary sheets.

Thereafter, the main sheet may be considered as a consumable that also serves to reveal the quality of the weld by analyzing its change in color, this analysis being performed after welding and once the main sheet has been unstuck.

By way of example, good welding performance within an optimized and safe operating window may be demonstrated by the presence of at most three zones presenting distinct color levels, each zone having predetermined dimensions, i.e.
- a first zone having a very dark color level, i.e. close to black, in the center of the weld and more particularly centered on the welding axis;
- a second zone distributed in two strips presenting an intermediate color on either side of the first zone, said strips defining the portion of the main sheet that has been thermally affected by the welding; and
- a third zone having a color level corresponding to the nominal color of the main sheet, i.e. the color of the main sheet prior to welding.

The weld is considered as being acceptable if the width of each zone is constant to within a margin of about plus or minus one millimeter, over the entire length of the weld. Any irregularity should be associated with a poor definition of weld starting conditions or indeed a problem in the process, e.g. associated with a defect in terms of position or of force.

Furthermore, the first zone must advantageously be of a width corresponding to the diameter of the welding pin of the welding tooling, while sometimes taking into consideration a margin, e.g. equal to plus or minus one millimeter. A width that is too narrow should be associated with a potential root defect, such as a lack of penetration of the welding pin, while a width that is too great should be associated with a tendency to collapse with an associated outside geometrical defect or with probable overheating and a risk of the welding alloy being burnt.

The thickness of the selected main sheet may be adapted to the thickness of the parts for assembly and/or to the material from which the parts are made, in particular concerning characteristics relating to the thermal conductivities of these materials, or indeed the material from which the main sheet is made. As an indication, the main sheet used is of a thickness lying between a dimension that is less than the thickness of the parts and a dimension that is of the order of twice the thickness of the parts.

The present invention also provides tooling for a friction-welding machine suitable for implementing the above-described method. The tooling comprises:
- a set of said clamps suitable for individually holding one or the other of the parts against the support face of said anvil;
- a said chuck associated with first motor means for driving it in rotation, the chuck carrying a said welding pin; and
- second motor means suitable for driving relative movements between the chuck and the anvil in at least one of the two directions corresponding to the support plane of the anvil that supports the parts, and also in a third direction that is orthogonal to the two-above mentioned directions.

The tooling of the present invention is recognizable in that it has as its main characteristic at least one main sheet made of a material having high thermal conductivity. The thickness of this main sheet lies between a dimension that is less than the thickness of said parts for assembly and a dimension of about twice the thickness of said parts. The main sheet is suitable for being pressed astride against the inside faces of both of the parts.

The tooling is suitable for being associated with a said housing in the anvil suitable for receiving said single main sheet, and optionally a set of spacers for interposing between the main sheet and the bottom of the housing. The housing opens out into the support face of the anvil and is suitable for positioning the single main sheet astride the inside faces of both parts. The housing is of a depth that makes it suitable for receiving the main sheet and optionally at least one of the spacers of said set, so that the main sheet and the support face of the anvil lie flush.

In a particular embodiment, the anvil houses a frame that includes said housing. The frame has cooling means, in particular constituted by ducts for conveying a cooling fluid in connection with a cooling force.

BRIEF DESCRIPTION OF THE DRAWINGS

The present invention is described with reference to the figures of the accompanying sheets which show embodiments, in which sheets:

FIGS. 4 to 6 show respectively different variants of embodiments of tooling for implementing a friction-welding method of the present invention; and FIG. 7 shows parts assembled by a method of the present invention, implemented using tooling such as that shown in FIGS. 4 to 6 respectively.

MORE DETAILED DESCRIPTION

Figure 1:
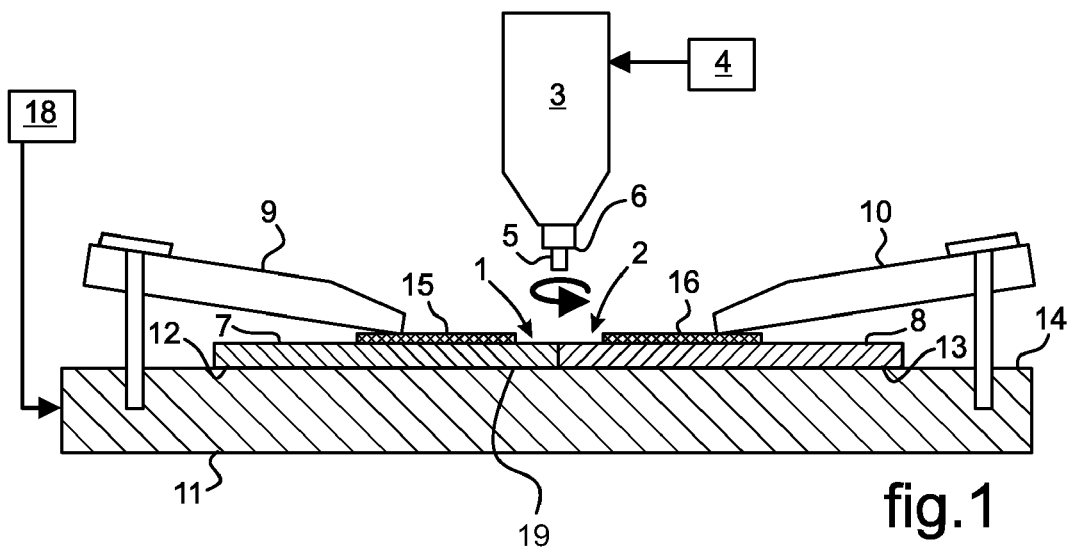
FIGS. 1 to 3 are successive diagrams showing a friction welding method in a first implementation of the present invention.
Figure 2:
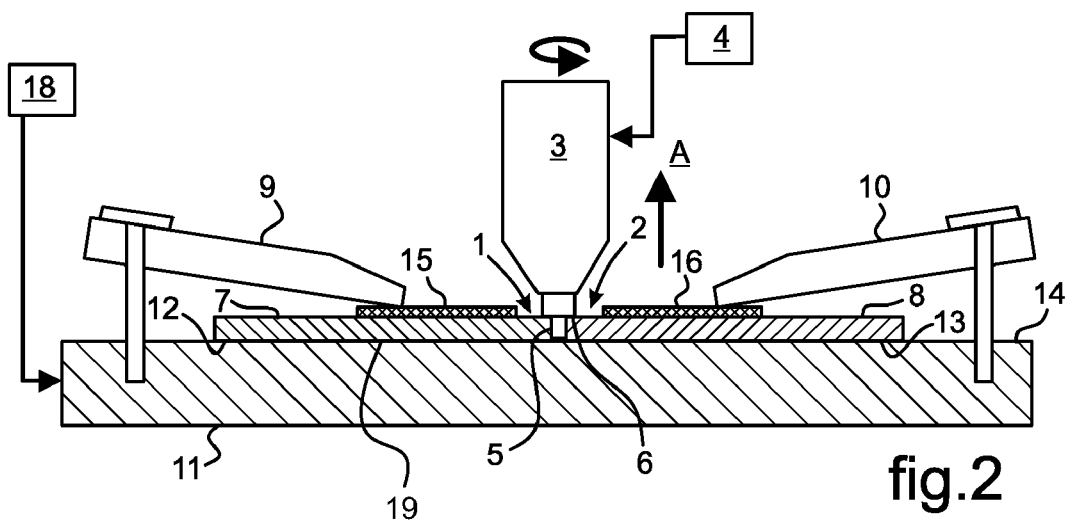
Figure 3:
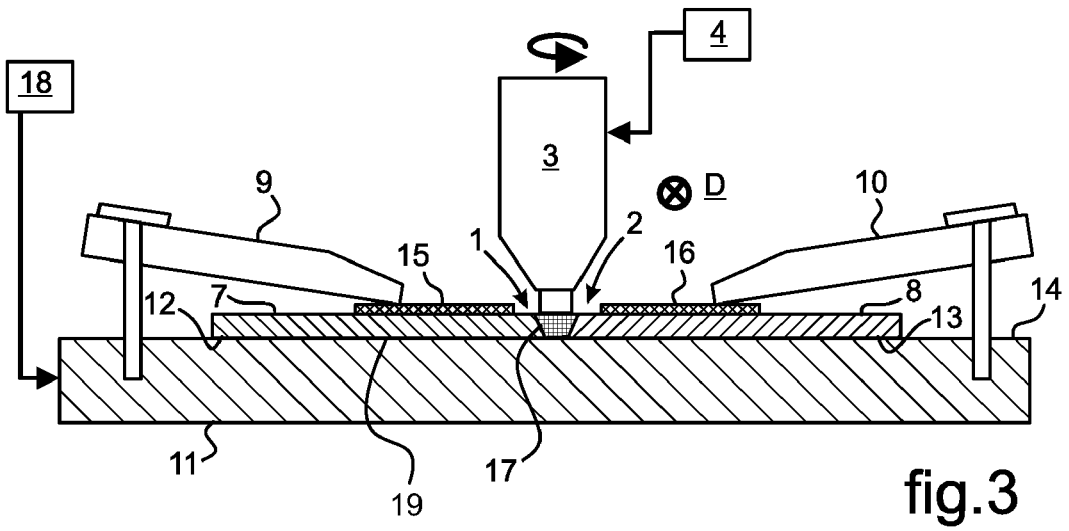

In FIGS. 1 to 3, a machine is organized to assemble together two plane parts 1 and 2 that are of small thickness, being about one millimeter thick. Assembly is performed more particularly using the known friction-welding technique. The machine comprises a chuck 3 that is driven in rotation by first motor means 4 and that carries a welding pin 5. The chuck 3 has a shoulder 6 that acts as a depth gauge, the welding operation being controlled in force as a result of the friction induced by the shoulder 6 rubbing against the top faces 7 and 8 of the parts 1 and 2 for assembling together. The machine is fitted with a set of clamps 9, 10 for pressing the parts 1 and 2 against an anvil 11. More particularly, the clamps 9 and 10 bear against the top faces 7 and 8 of each of the parts 1 and 2, which parts bear in reaction via their bottom faces 12 and 13 against a support face 14 of the anvil 11. The parts 1 and 2 are held pressed against the anvil 11 while being placed adjacent to each other, their facing edges being in contact against each other.

Secondary sheets 15 and 16 are interposed respectively between the clamps 9 and 10 and the corresponding parts 1 and 2 so that the sheets are held pressed against the top faces 7 and 8 of the parts 1 and 2. It will be understood that these secondary sheets 15 and 16 extend along the entire length of the adjacent edges of the parts 1 and 2. The secondary sheets 15 and 16 are made of a metallic material, preferably based on copper, which presents the advantage of being a material that is suitable for picking up the heat induced by the friction of the welding pin 5 against the parts 1 and 2 while the weld bead 17 is being formed, and in diffusing ample quantities of this picked-up heat into the ambient medium. These arrangements seek to reduce and to regulate the temperature in the weld zone in which the welding pin 5 is rubbing against the parts 1 and 2. By way of non-limiting indication, a satisfactory temperature for welding parts having thickness of about one millimeter is about 200° C. Picking up the heat and diffusing it away from the welding zone by means of the secondary sheets 15 and 16 serves to increase production speeds without harming the qualities required of the resulting weld bead 17.

More particularly in FIG. 1, the parts 1 and 2 are installed on the anvil 11 and the secondary sheets 15 and 16 are located close to the adjacent edges of the parts 1 and 2. Each assembly constituted by a secondary sheet 15 or 16 and a corresponding part 1 or 2 is clamped by one of the clamps 9 or 10. The first motor means 4 are operated to set the chuck 3 into rotation.

In addition, a single main sheet 19 of high thermal conductivity is kept pressed against the bottom faces 12 and 13 of the parts 1 and 2, overlapping both sides of their adjacent edges and thus being pressed against the location of the future weld bead.

This main sheet 19 is placed on the anvil 11 in the implementation shown diagrammatically in FIGS. 1 to 3. As described below for another embodiment, the main sheet 19 may be received in a housing formed in the anvil 11.

In FIG. 2, the anvil 11 or the chuck 3 is moved along an axis A corresponding to the gravity axis in order to bring the welding pin 5 and the parts 1 and 2 towards each one another. This movement is continued until the welding pin 5 passes through the parts 1 and 2 at their adjacent edges. The weld bead 17 is thus started. Any movements imparts to the anvil 11 are driven, in particular, by second motor means 18.

The chuck is preferably fitted with sensors suitable for measuring the opposing pressure forces between the chuck and the parts for assembling together in the welding zone. As an indication, these pressure forces lie in the range 1 kilonewtons (kN) to 10 kN, and more particularly they are of the order of 5 kN.

In FIG. 3, the welding pin or the parts have moved relative to one another causing the welding pin to advance relative to the adjacent edges of the parts 1 and 2 so as to form the weld bead 17. This movement takes place along at least one of the directions D in which the general plane of the parts 1 and 2 extends. Following the step of starting the weld bead 17, a transient step may be engaged to assess the appropriateness of the speed of rotation of the chuck 3 and/or of the speed of relative displacement between the welding pin 5 and the parts 1 and 2. Once the transient step has been completed, formation of the weld bead 17 continues until it is terminated at the end of the stroke. In the weld zone, the friction of the welding pin 5 against the parts 1 and 2 induces a temperature rise that causes the parts 1 and 2 to be put into a pasty state and causes the material of each part to spread towards the material of the other. The weld bead 17 is formed from a mixture of the materials coming from each of the parts 1 and 2. The pasty state of the parts 1 and 2 is maintained in spite of their small thickness because of the presence of the main sheet 19 and of the optional secondary sheets 15 and 16 that pick up and diffuse the heat induced by the welding pin 5 rubbing against the parts 1 and 2. As the welding pin 5 advances relative to the parts 1 and 2 along their adjacent edges, material that was previously put into the pasty state recrystallizes. The presence of the main sheet 19 and of the secondary sheets 15 and 16 and the diffusion of the sheets that they pick up and then diffuse encourages this recrystallization under satisfactory required conditions. A step of progressively stopping the relative movement between the welding pin 5 and the parts 1 and 2 is desirable in an end-of-stroke step. Once the weld bead 17 has been completed, the welding pin 5 is removed from the parts 1 and 2 and rotation of the chuck 3 is stopped. Recrystallization of the weld bead 17 finishes off progressively in ambient air.

In FIGS. 4 and 5, the parts 1 and 2 are pressed against the anvil 11 by means of the clamps 9 and 10 that are in direct contact with the top faces 7 and 8 of the parts 1 and 2. A single main sheet 19 of high thermal conductivity is kept pressed against the bottom faces 12 and 13 of the parts 1 and 2, overlapping the adjacent edges thereof. The anvil 11 includes a housing 20 for receiving the single main sheet 19, being positioned in such a manner that the single main sheet 19 and the support face 14 of the anvil 11 lie flush. The dimensions of the housing 20 in the support plane correspond to the dimensions of the single main sheet 19 so that it is possible for the single main sheet 19 to be installed quickly and easily on the anvil 11.

The thickness of the main sheet 19 and of the secondary sheets 15 and 16 is significantly smaller than the thickness of the parts 1 and 2. Nevertheless, the thickness of the parts 1 and 2 may vary from one welding operation to another, by way of indication this thickness is less than 1.5 mm. It is preferable to use sheets 15, 16, 19 that are of constant thickness regardless of the thicknesses of the parts 1 and 2 that are to be assembled together by implementing the method of the invention. Nevertheless, it is also possible to provide specific arrangements that enable the thickness of the main sheet 19 to be varied as a function of the thicknesses of the parts 1 and 2.

In the embodiment shown in FIG. 4, the depth of the housing 20 is greater than the thickness of the main sheet 19. To ensure that it is flush, spacers 21 are interposed between the main sheet 19 and the bottom of the housing 20. These spacers 21 are of appropriate thickness, being selected from a set of spacers 21 having respective thicknesses.

In the embodiment shown in FIG. 5, the housing 20 is of a depth equivalent to the thickness of the main sheet 19 so as to obtain said flush surfaces. In this embodiment, it is possible to envisage providing the housing 20 in an interchangeable frame 22 received by the anvil 11, the frame 22 forming part of a set of frames having housings 20 of respective depths.

Still in FIG. 5, a frame such as the frame 22 in the embodiment shown includes the housing 20 that receives the main sheet 19. The frame 22 is fitted with cooling means 23 to encourage evacuation of the heat picked up by the main sheet 19. In the embodiment shown, the cooling means 23 comprise channels suitable for conveying a cooling liquid in order to take away heat. The frame 22 is thermally conductive and transmits heat by coming into contact with the main sheet 19. The temperature of the coolant liquid may be determined depending on the welding operation that is to be performed, and/or may be varied during the welding operation as a function of the temperature measured locally in the welding zone by a temperature sensor 24 or by analogous members.

In FIG. 6, the variant embodiments shown respectively in FIGS. 1 to 3 and in FIGS. 4 and 5, are associated so as to optimize diffusion of the heat picked up by the main sheet 19 and the secondary sheets 15 and 16 pressed against the parts 1 and 2. More particularly, the secondary sheets 15 and 16 are associated with respective ones of the top faces 7 and 8 of the parts 1 and 2, while the main sheet 19 is associated with the bottom faces 12 and 13 of the parts 1 and 2, being received in a housing 20 included in the anvil 11, and overlapping on either side of the adjacent edges of the parts 1 and 2.

FIG. 7 shows the parts 1 and 2 after they have been assembled together by any one of the methods shown in FIGS. 4 to 6. The parts 1 and 2 are assembled together by a weld bead 17. The main sheet 19 that was placed against the bottom faces 12 and 13 of the parts 1 and 2 during the welding operation sticks to the parts 1 and 2 because of the temperature that was induced and because of the spreading of the material coming from both of the parts 1 and 2. The main sheet 19 is a lost or sacrificial element that is left in place against the bottom faces 12 and 13 of the parts 1 and 2 while they are in storage and/or being transported, prior to being used. Keeping the main sheet 19 in place in this way serves to protect the weld bead 17 during such periods of storage and/or transport.

Furthermore, the main sheet 19 and the secondary sheets 15 and 16 used in the method of the present invention are made of a material presenting an appearance 25 that is modified as a function of the temperature to which it is subjected, such as copper. This modification to the appearance 25 makes it easy with the naked eye to assess the regularity and the value of the temperatures to which the main sheet 19 and the secondary sheets 15 and 16 were subjected during the welding operation, and thus serves to evaluate the quality of the resulting weld bead 17 over its entire length.

What is claimed is:

1. A method of assembling together two parts by friction welding, the method comprising the following operations:
   pressing the parts for assembly individually against an anvil and adjacent to each other by means of at least one set of clamps pressing individually against one or the other of the large faces of the parts, which faces are referred to as top faces, such that the parts apply opposing thrust against a support face of the anvil via their opposite large faces, referred to as bottom faces;
   setting into rotation a chuck provided with a welding pin and with a shoulder, and causing the chuck and the anvil to move relative to each other so as to bring the welding pin towards the top large faces of the parts for assembly;
   pressing the welding pin through both adjacent edges of the parts to cause the material of the parts to be heated by friction in the weld zone, so as to cause the material to spread and mix between the parts;
   causing the chuck and the anvil to move in relative translation in at least one direction corresponding to the direction in which the adjacent edges of the parts for assembly extend, so as to obtain a weld bead;
   inducing recrystallization of the material forming the weld bead by the parts cooling, whether in ambient air or by using an assisted cooling technique;
   wherein a sacrificial single main sheet is pressed against the weld bead and astride the bottom faces of both of the parts, the main sheet being made of a material having high thermal conductivity, the main sheet being suitable for removing by conduction the heat induced by the friction of the chuck against the parts and for dissipating the heat by conduction and by radiation, the single main sheet being made from a material that presents external appearance that is modified by the temperature rise to which it has been subjected; and
   identifying the color of the single main sheet at the end of the welding operation in order to inspect the quality of the weld that has been made, wherein proper welding is demonstrated by the presence of at most three zones having distinct color levels, each zone having predetermined dimensions, wherein the single main sheet is arranged in a housing and supported by spacers interposed between the bottom of the housing and the single main sheet.

2. A method according to claim 1, further comprising allocating at least one secondary sheet to each of the parts and maintaining the secondary sheet pressed against the top face of the part to which it is allocated.

3. A method according to claim 2, further comprising interposing the secondary sheets between at least one clamp and the corresponding parts.

4. A method according to claim 1, wherein the housing is formed in the anvil and opens out into its support face, the main sheet being substantially flush with the support face of the anvil.

5. A method according to claim 4, further comprising providing the housing in a frame fitted with cooling means that are suitable for exchanging heat between the single main sheet and the cooling means.

6. A method according to claim 1, wherein the main sheet is made of a material that is based on copper.

7. A method according to claim 1, wherein the main sheet has a thickness that is smaller than the thickness of the parts.

8. The method of claim 1, wherein the parts are pressed against each other on the anvil such that the parts do not overlap and the sacrificial sheet is disposed between the parts and the anvil, and the anvil being at ambient temperature.

9. The method of claim 1, wherein the top large faces extend in the same plane and wherein the shoulder of the chuck is disposed on the top large faces of the parts during the operation of causing the chuck and the anvil to move in relative translation.

10. The method of claim 1, where the sacrificial sheet is about one-tenth the thickness of one of the parts.

11. The method of claim 1, where the sacrificial sheet has a width of about 20 mm and a length that is about the length of one of the parts.

12. The method of claim 1, where the sacrificial sheet sticks to the parts and is left in place against the bottom faces of the parts after the recrystallization operation.

13. A method of assembling together two parts by friction welding, the method comprising the following operations:
    pressing the parts for assembly individually against an anvil and adjacent to each other by means of at least one set of clamps pressing individually against one or the other of the large faces of the parts, which faces are referred to as top faces, such that the parts apply opposing thrust against a support face of the anvil via their opposite large faces, referred to as bottom faces;
    setting into rotation a chuck provided with a welding pin and with a shoulder, and causing the chuck and the anvil to move relative to each other so as to bring the welding pin towards the top large faces of the parts for assembly;
    pressing the welding pin through both adjacent edges of the parts to cause the material of the parts to be heated by friction in the weld zone, so as to cause the material to spread and mix between the parts;
    causing the chuck and the anvil to move in relative translation in at least one direction corresponding to the direction in which the adjacent edges of the parts for assembly extend, so as to obtain a weld bead;
    inducing recrystallization of the material forming the weld bead by the parts cooling, whether in ambient air or by using an assisted cooling technique;
    pressing a sacrificial single main sheet against the weld bead and astride the bottom faces of both of the parts, the single main sheet being made of a material having high thermal conductivity, the single main sheet being suitable for removing by conduction the heat induced by the friction of the chuck against the parts and for dissipating the heat by conduction and by radiation, at least a portion of the main sheet sticking to the parts by the formation of the weld bead; and
    identifying the color of the single main sheet after the main sheet sticks to the parts at the end of the welding operation in order to inspect the quality of the weld that has been made, wherein the single main sheet is arranged in a housing and supported by spacers interposed between the bottom of the housing and the single main sheet.

14. A method of assembling together two parts by friction welding, the method comprising the following operations:
    pressing the parts for assembly individually against an anvil and adjacent to each other such that the parts apply opposing thrust against a support face of the anvil;
    setting into rotation a chuck provided with a welding pin and with a shoulder, and causing the chuck and the anvil to move relative to each other so as to bring the welding pin towards the parts for assembly;
    pressing the welding pin through the parts to cause the material of the parts to be heated by friction so as to cause the material to spread and mix between the parts;
    causing the chuck and the anvil to move in relative translation in at least one direction so as to obtain a weld bead; and
    pressing a sacrificial single main sheet against the weld bead and astride the parts, the main sheet being made of a material having high thermal conductivity, the main sheet being suitable for removing by conduction the heat induced by the friction of the chuck against the parts and for dissipating the heat by conduction and by radiation;
    inducing recrystallization of the material forming the weld bead by the parts cooling, whether in ambient air or by using an assisted cooling technique;
    wherein the single main sheet has a thickness that is smaller than the thickness of the parts and wherein the single main sheet is arranged in a housing and supported by spacers interposed between the hosing and the single main sheet.

15. The method of claim 1, wherein the single main sheet has a width that is narrower than the widths of the parts.

16. The method of claim 15, wherein the single main sheet is about 20 mm wide, covers the weld bead, and has a length not less than the lengths of the parts.

* * * * *